(12) United States Patent
Sung

(10) Patent No.: US 8,537,533 B2
(45) Date of Patent: Sep. 17, 2013

(54) ELECTRONIC DEVICE WITH SUPPORT ASSEMBLY

(75) Inventor: Hsiung-Wei Sung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 223 days.

(21) Appl. No.: 13/244,654

(22) Filed: Sep. 25, 2011

(65) Prior Publication Data

US 2012/0262853 A1    Oct. 18, 2012

(30) Foreign Application Priority Data

Apr. 13, 2011    (CN) .......................... 2011 1 0092636

(51) Int. Cl.
| | |
|---|---|
| G06F 1/16 | (2006.01) |
| H05K 5/00 | (2006.01) |
| H05K 7/00 | (2006.01) |
| H05K 7/16 | (2006.01) |
| H05K 7/02 | (2006.01) |
| H05K 7/04 | (2006.01) |

(52) U.S. Cl.
USPC ............ 361/679.28; 361/679.01; 361/679.02; 361/725; 361/727; 361/810

(58) Field of Classification Search
USPC .................. 361/610, 679.01, 679.02, 679.04, 361/679.05, 679.06, 679.07, 679.08, 679.11, 361/679.12, 679.15, 679.16, 679.17, 679.2, 361/361/679.27, 679.28, 679.29, 679.39, 361/683, 725, 726, 727, 755, 810
See application file for complete search history.

(56) References Cited

U.S. PATENT DOCUMENTS

| | | | | | |
|---|---|---|---|---|---|
| 2,471,545 | A | * | 5/1949 | Rosenberg et al. ............. | 40/784 |
| 3,731,413 | A | * | 5/1973 | Hooper, Jr. ..................... | 40/765 |
| 6,331,940 | B1 | * | 12/2001 | Lin ................................ | 361/785 |
| 7,933,129 | B2 | * | 4/2011 | Chen ............................. | 361/801 |
| 8,196,326 | B2 | * | 6/2012 | Frey ............................... | 40/729 |

* cited by examiner

*Primary Examiner* — Hoa C Nguyen
*Assistant Examiner* — Binh Tran
(74) *Attorney, Agent, or Firm* — Altis Law Group, Inc.

(57) ABSTRACT

An electronic device includes a main body and a support assembly. The support assembly includes four support components arranged at four sides of the main body. Each support component includes a first arm and a second arm. A first arm includes a first end portion rotatably connected to one end of one of the four sides of the main body, and a second end portion extending from an end of the first arm. The second arm includes a third end portion rotatably connected to the other end of the side of the main body and defines a sliding groove. A pin is connected to the second end portion and slidably received in the sliding groove. The pin is capable of being held in various positions by friction between the pin and the sliding groove, allowing the support components to maintain at a desired orientation for supporting the main body.

4 Claims, 3 Drawing Sheets

ELECTRONIC DEVICE WITH SUPPORT ASSEMBLY

BACKGROUND

1. Technical Field

The present disclosure relates to electronic devices, and more specifically to an electronic device having a support assembly.

2. Description of Related Art

It is common for people to take their portable electronic devices, such as digital photo frames and tablet computers, with them when traveling. Typically the photo frames include a stand for supporting the frames in an upright position on a desk or other flat surface. Although this type of stand is somewhat useful, a stand with a new support structure is still needed.

DETAILED DESCRIPTION

Figure 1:
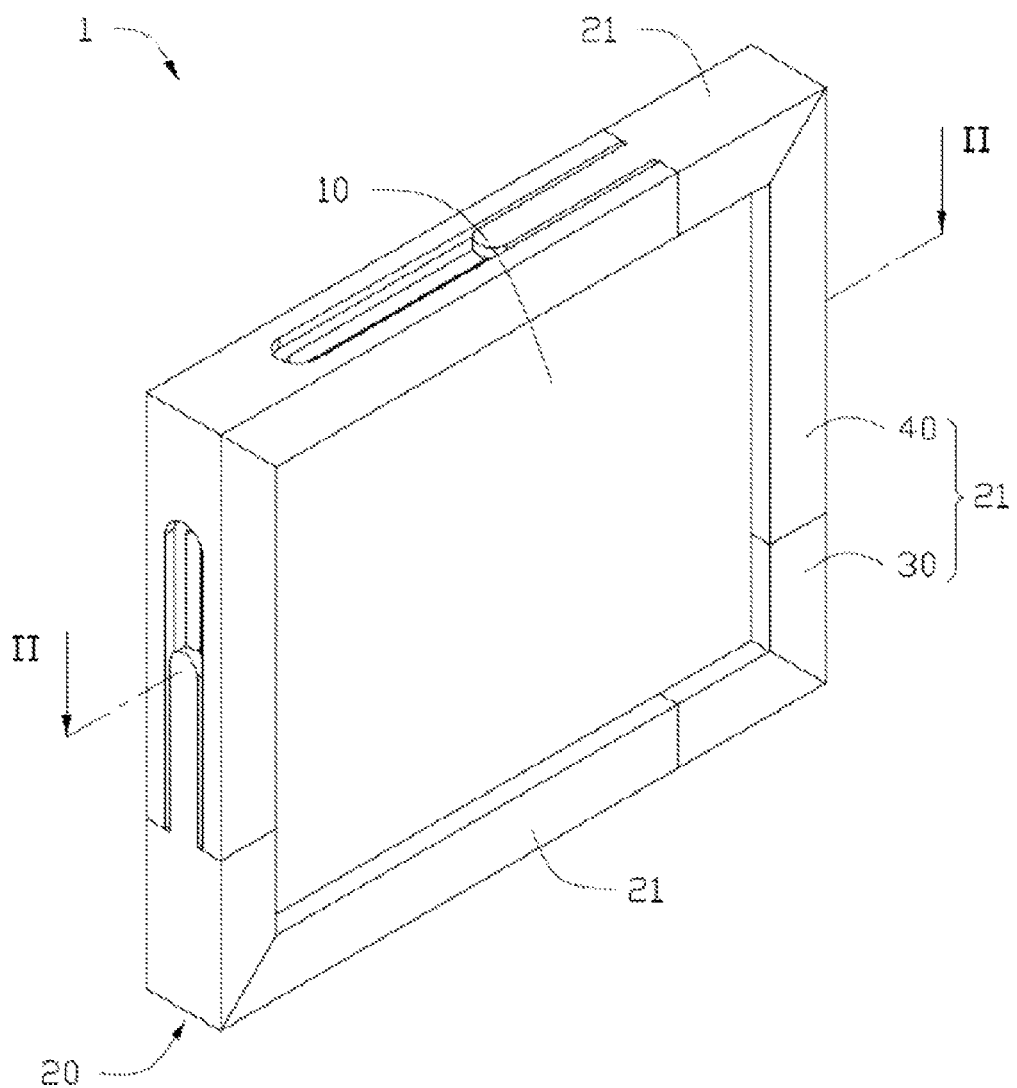
FIG. 1 is an isometric view of an electronic device with a support assembly in a first state, in accordance with an embodiment.
Figure 2:
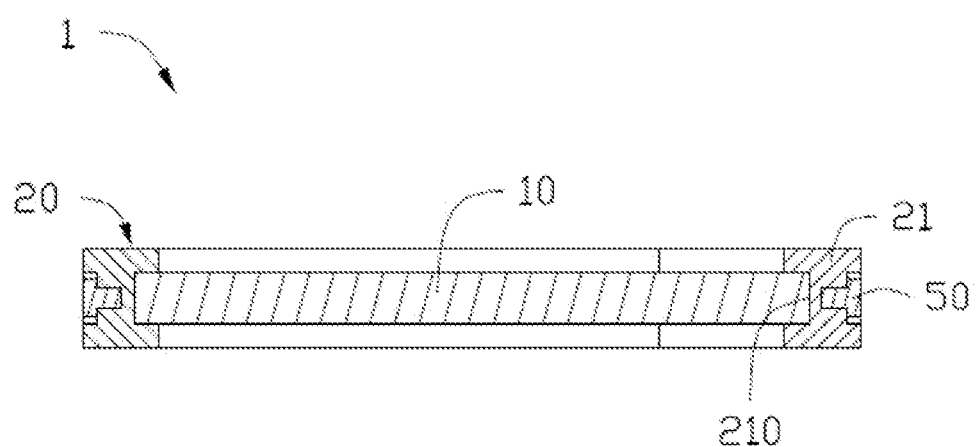
FIG. 2 is a cross-sectional view of the electronic device of FIG. 1, along line
Figure 3:
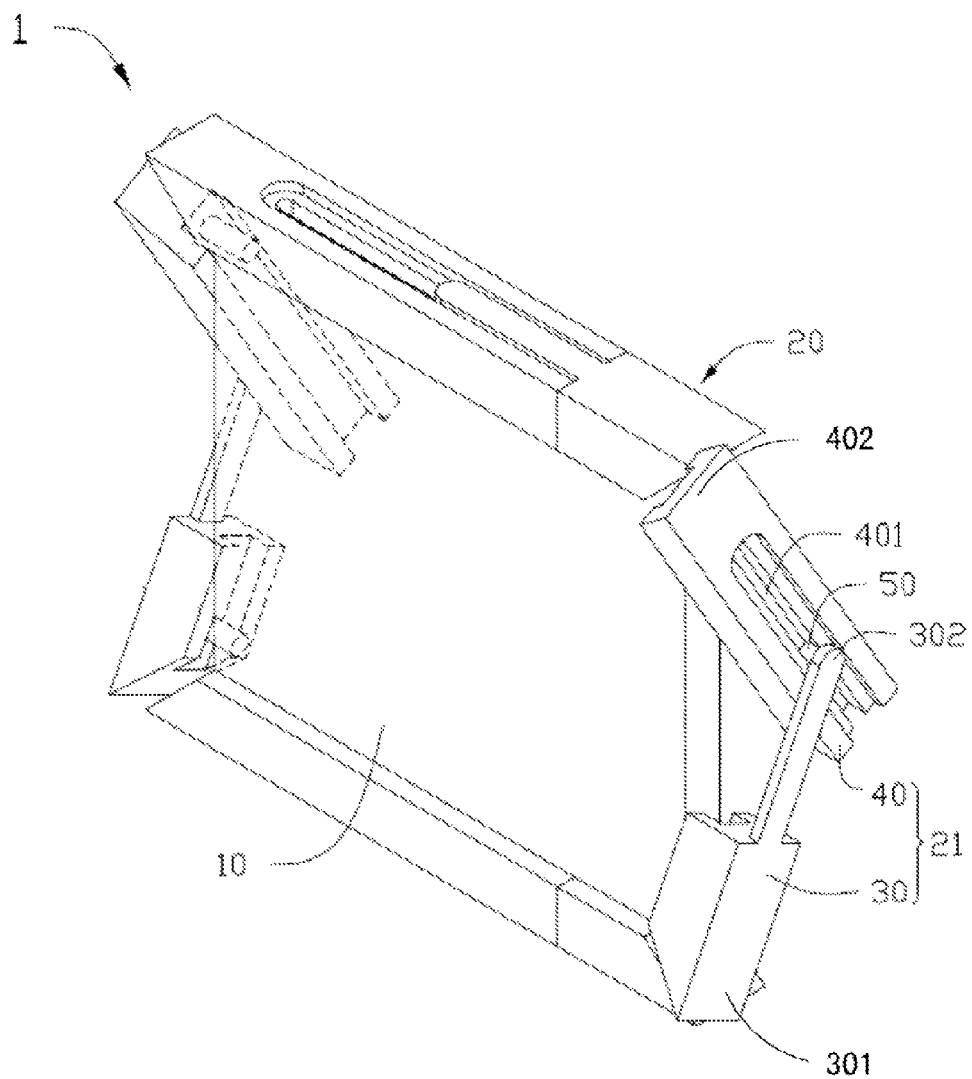
FIG. 3 is similar to FIG. 1, but showing the support assembly in a second state.

Referring to FIGS. 1-3, an exemplary embodiment of an electronic device 1 is illustrated. The electronic device 1 can be a tablet computer, a digital photo frame, etc.

The electronic device 1 includes a main body 10 and a support assembly 20 including four support components 21. Each support component 21 is arranged at one side of the main body 10. Each support component 21 includes a first arm 30 and a second arm 40, which are connected to each other and can rotate and slide relative to each other.

When the support assembly 20 is not in use, the support components 21 abut against one side of the main body 10, thereby protecting the electronic device 1 (see FIGS. 1-2). When the support assembly 20 is in use, the first and second arms 30, 40 of two opposite support components 21 are rotated to an angled state, and can support the main body 10 (see FIG. 3).

Referring to FIG. 3, a first end portion 301 of the first arm 30 is rotatably connected to one end of a side of the main body 10. A second end portion 302 extending from an end of the first arm 30 is rotatably connected to a pin 50. The second arm 40 defines a sliding groove 401 and includes a third end portion 402 rotatably connected to the other end of the side of the main body 10. The pin 50 is movably received in the sliding groove 401 and can slide in the sliding groove 401. The main body 10, the pin 50, and the first and second arms 30, 40 form a linkage bar mechanism.

When not in use, the first and second arms 30, 40 are pushed to abut against the main body 10. To use the support assembly 20, a user can select two opposite support components 21 according to a desired orientation of the electronic device 1, such as portrait or landscape, and push the selected support components 21, so that the pin 50 slides in the sliding groove 401 away from the third end portion 402 until a desired angle is formed between the first and second components 30, 40 as shown in FIG. 3. In the embodiment, the first and second arms 30 and 40 rotate in a plane perpendicular to the front surface of the main body 10. The two support components 21 thus form two support legs to support the main body 10. In the embodiment, the pin 50 can be retained at a desired position by friction between the pin 50 and the interior of the sliding groove 401. To adjust the angle between the main body and a support surface (i.e., desktop), the user can push the first and second arms 30, 40, sliding the pin 50, until a desired angle is obtained.

Referring also to FIG. 2, the first and second arms 30, 40 of each support component 21 cooperatively define a receiving groove 210 to receive one side of the main body 10. Therefore, the four support components 21 can protect the electronic device 1 from being damaged such as when accidentally dropped. In the embodiment, at least the portions of the support component 21 defining the receiving grooves 210 are made of rubber or other flexible material, so that the components 21 can firmly sandwich the sides of the main body 10 in the first state as shown in FIG. 1, but are flexible enough to be resiliently deformed when gripped and rotated with respect to the main body 10 to the second state as shown in FIG. 3.

Although the present disclosure has been described in accordance with the embodiments shown, one of ordinary skill in the art will readily recognize that there could be variations to the embodiments and those variations would be within the spirit and scope of the present disclosure. Accordingly, many modifications may be made by one of ordinary skill in the art without departing from the spirit and scope of the appended claims.

What is claimed is:

1. An electronic device comprising: a main body; and a support assembly comprising four support components arranged around four sides of the main body, each support component comprising: a first arm comprising a first end portion rotatably connected to one end of one of the four sides of the main body, and a second end portion extending from an end of the first arm; a second arm comprising a third end portion rotatably connected to the other end of the side of the main body and defining a sliding groove; and a pin connected to the second end portion of the first arm and slidably received in the sliding groove, wherein the pin is capable of being held in various positions by friction between the pin and the sliding groove, thereby allowing the support components to maintain at a desired orientation for supporting the main body; wherein each support component defines a receiving groove to receive a corresponding one of the four sides of the main body, allowing the support component to sandwich the corresponding side of the main body.

2. The electronic device as described in claim 1, wherein portions of the support components defining the receiving grooves are made of rubber.

3. The electronic device as described in claim 1, wherein the support components are made of rubber.

4. The electronic device as described in claim 1, wherein the first and the second arms of each support component cooperatively define the receiving groove.

* * * * *